Dec. 4, 1956   J. N. ROGERS   2,772,510
ANIMAL TRAP AUXILIARY GUARD THUMB CATCH
Filed Sept. 28, 1954

INVENTOR.
Joseph Norman Rogers
BY Victor J. Evans & Co.
ATTORNEYS

United States Patent Office 2,772,510
Patented Dec. 4, 1956

2,772,510
ANIMAL TRAP AUXILIARY GUARD THUMB CATCH

Joseph Norman Rogers, Lafitte, La.

Application September 28, 1954, Serial No. 458,887

2 Claims. (Cl. 43—96)

This invention relates to animal traps of the type commonly known as steel traps, and in particular, a steel trap having an auxiliary guard extended around the gripping elements and a thumb catch slidably mounted on a spring actuating member and positioned to hold the auxiliary guard until gripping elements of the trap are snapped into gripping relation with an animal.

The purpose of this invention is to provide a latch for holding an auxiliary guard of an animal trap whereby the guard is inoperative until the trap is sprung.

In numerous instances, animals are caught in steel traps by one leg and eventually work the leg free. Conventional auxiliary guards used on animal traps of this type are difficult to set and are also difficult to release, primarily because of the complicated latches with which they are held. With this thought in mind, this invention contemplates a T-shaped element slidably mounted by arms thereof on a spring of a trap with the extended end of the stem connected by a hook to the chain by which the trap is anchored and with a tongue projecting from the stem for engagement with an auxiliary guard.

The object of this invention is, therefore, to provide means for forming a latch for retaining an auxiliary guard in inoperative position in which the latch is adapted to be slidably mounted on a part of a trap.

Another object of the invention is to provide a latch for retaining an auxiliary guard of an animal trap in inoperative position in which the latch is adapted to be applied to traps now in use without changing the trap structure.

A further object of the invention is to provide a latch for retaining an auxiliary guard of an animal trap in inoperative position in which the latch is of a simple and economical construction.

With these and other objects and advantages in view, the invention embodies a T-shaped piece of material having arms extended from a stem with the arms adapted to be formed around a flat plate for slidably mounting the latch on the plate, with one end of the stem extended and having a chain attaching eye extended therefrom and with an offset tongue extended from the opposite end of the stem and positioned to engage a spring guard of an animal trap.

Other features and advantages of the invention will appear from the following description taken in connection with the drawing, wherein.

Figure 1:
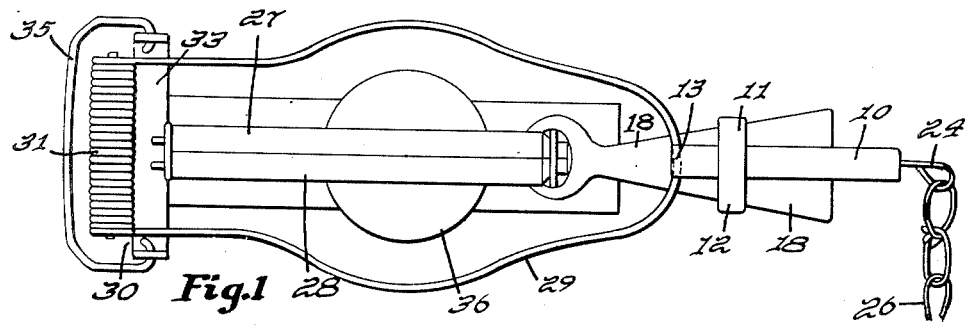
Figure 1 is a plan view showing the latch of this invention positioned on a spring actuating member of an animal trap.

Referring now to the drawing, wherein like reference characters denote corresponding parts, the improved latch or catch of this invention includes a bar 10 having laterally disposed arms 11 and 12, an offset tongue 13 extended from one end of the bar and a flange 14 with an opening 15 therein extended from the opposite end of the bar.

Figure 4:
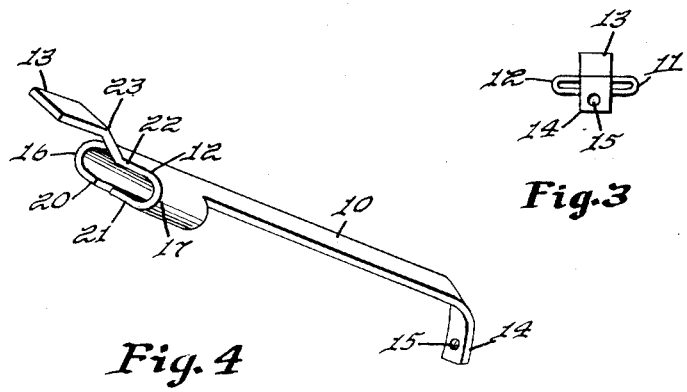
Figure 4 is a perspective view showing the improved latch.
Figure 3:
Figure 3 is an end elevational view of the latch looking toward the end in which the chain attaching eye is positioned.

As illustrated in Figure 4, the arms 11 and 12 are provided with arcuate ends 16 and 17 which extend around an upper plate 18 of a spring 19 and from the arcuate end portions the straight portions 20 and 21 extend inwardly providing U-shaped sections by which the latch is slidably mounted on the plate 18.

From the arms 11 and 12, the bar 10 extends forwardly to a point 22 and from the point 22 the bar extends upwardly to a point 23 from which the tongue 13 extends.

A hook 24 is positioned with the shank thereof extended through the opening 15 in the flange 14 and the end of the shank is upset providing a head 25 by which the hook is retained on the latch.

Figure 2:
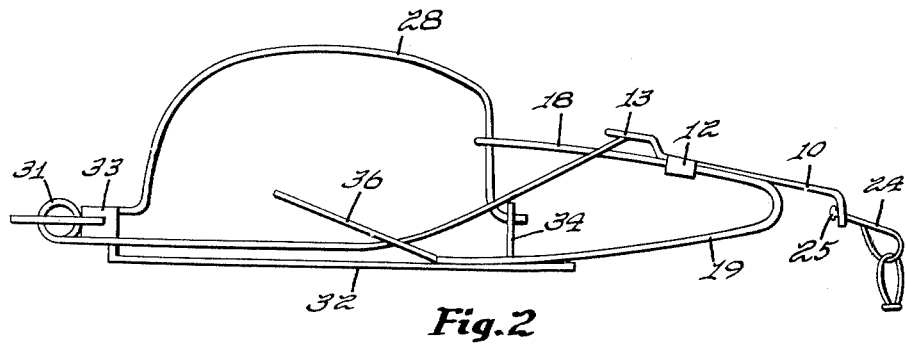
Figure 2 is a side elevational view of the animal trap showing the latch positioned whereby the tongue thereof extends over an extended end of a spring guard of the trap.

An anchoring chain 26 is secured in the loop of the hook 24 and with the parts in position as illustrated in Figures 1 and 2 a final lunge of an animal between the jaws 27 and 28 of a trap causes a pull on the chain which draws the latch outwardly whereby the tongue 13 releases a spring guard 29 and is pivotally mounted on a base 30 of the trap and which is biased by a coil spring 31.

The trap illustrated in the drawing is provided with a base 32 having a bar 33 at one end in which ends of the jaws 27 and 28 are pivotally mounted and a flange 34 at the opposite end in which the opposite ends of the jaws are pivotally mounted. The bar 33 is provided with a handle 35 that provides a guard for the spring 31 and a bait-receiving platform or trigger 36 is positioned on the intermediate part of the base.

It will be understood, however, that the latch, particularly as illustrated in Figure 4, is adapted to be used on traps of different types and designs.

It will also be understood that modifications, within the scope of the appended claims, may be made in the design and arrangement of the parts without departing from the spirit of the invention.

What is claimed is:

1. A latch for an auxiliary spring guard of an animal trap of the type having spring actuated jaws and an anchoring chain comprising a bar, laterally extending arm portions on said bar adjacent one end thereof, means on the ends of the arms, for slidably mounting the bar on the trap, means for connecting an extended end portion of the bar to an anchoring chain of the trap, and an offset tongue portion extended from said one end of the bar and positioned to extend over the auxiliary spring guard of the trap.

2. In an animal trap of the type having a spring guard and an anchoring chain, the combination which comprises a T-shaped latch having laterally disposed U-shaped arm portions extended from a stem portion, an arcuate shaped flange portion having a hook therein extended from one end of the stem and an offset tongue portion extended from the opposite end of the stem, said latch being adapted to be slidably mounted on the trap with the tongue extended over the spring guard in set position and with an anchoring chain attached to the hook.

References Cited in the file of this patent

UNITED STATES PATENTS

| 214,975 | Williams | Apr. 29, 1879 |
| 1,939,190 | Terry | Dec. 12, 1933 |
| 2,123,094 | Briddell | July 5, 1938 |
| 2,311,378 | Galiano | Feb. 16, 1943 |
| 2,501,928 | Blunt | Mar. 28, 1950 |

FOREIGN PATENTS

| 2,797 | Great Britain | 1912 |